United States Patent [19]
Freeman

[11] Patent Number: 5,804,741
[45] Date of Patent: Sep. 8, 1998

[54] DIGITAL PHASE LOCKED LOOP SIGNAL PROCESSING FOR CORIOLIS MASS FLOW METER

[75] Inventor: Belvin S. Freeman, Asheville, N.C.

[73] Assignees: Schlumberger Industries, Inc., Norcross, Ga.; Continuum Technology Corp., Fletcher, N.C.

[21] Appl. No.: 748,477

[22] Filed: Nov. 8, 1996

[51] Int. Cl.$^6$ .................................................... G01F 1/84
[52] U.S. Cl. ...................................... 73/861.356; 364/510
[58] Field of Search ....................... 73/861.355, 861.356, 73/861.357; 364/510

[56] References Cited

U.S. PATENT DOCUMENTS

| | | |
|---|---|---|
| Re. 31,450 | 11/1983 | Smith . |
| 4,422,338 | 12/1983 | Smith . |
| 4,491,025 | 1/1985 | Smith et al. . |
| 4,757,390 | 7/1988 | Mehrgardt et al. ..................... 358/310 |
| 4,852,410 | 8/1989 | Corwon et al. . |
| 4,934,196 | 6/1990 | Romano . |
| 5,218,869 | 6/1993 | Pummer ..................................... 83/629 |
| 5,429,002 | 7/1995 | Colman . |
| 5,469,748 | 11/1995 | Kalotay .............................. 73/861.356 |
| 5,555,190 | 9/1996 | Derby et al. ....................... 73/861.356 |
| 5,578,764 | 11/1996 | Yokoi et al. ....................... 73/861.356 |

OTHER PUBLICATIONS

Spitzer, Davd A.; "Industries Flow Measurement"; pp. 197–210; 1990 U.S.A.

DeCarlo, Joseph P.; Fundamentals of Flow Mesurement; pp. 208–220; 1984 U.S.A.

Primary Examiner—George M. Dombroske
Assistant Examiner—Harshad Patel
Attorney, Agent, or Firm—Dority & Manning, PA

[57] ABSTRACT

A Coriolis-type fluid flow rate measuring system uses phase locked loop-based signal processing to estimate a tube vibration signal and maintain optimum tube vibrations. Analog sinusoidal sensor signals from the flow meter are digitized and processed through heterodyne mixing as part of phase locked loop tracking of the fundamental vibration or oscillation frequency. Digital signal processing is used to implement filtering and signal manipulation so as to respectively determine phase and frequency estimates for both of the two digitized signals. Frequency estimate data is used to adjust the tracker frequency mixed with the respective sensor signals. Digitally obtained phase and frequency estimate data are used to determine an optimized drive signal for continuing tube vibration. Phase estimate information for the two respective sensor signals is used to determine phase shift data, used in turn to determine a fluid flow rate through the flow meter.

29 Claims, 6 Drawing Sheets

DIGITAL PHASE LOCKED LOOP SIGNAL PROCESSING FOR CORIOLIS MASS FLOW METER

BACKGROUND OF THE INVENTION

The present invention relates in general to an improved Coriolis mass flow meter arrangement and in particular to a digital signal processing technique for maintaining optimum tube vibrations during meter use.

The basic construction and operation of a variety of conventional Coriolis-type mass flow rate meters are well known to those skilled in the art and readily commercially available. One such arrangement relates to a Coriolis-type flow meter of the type having at least two analog sensor channels (sensor signals) and an electromagnetically-driven vibrating-tube design. Generally speaking, a pair of shaped parallel flow conduits are driven to oscillate, such as at a resonant frequency associated with the tubes (and their contents). Analysis of the sensor signals describing the vibration of the two flow paths, using known equations, relationships, and techniques, may result in derivation of the fluid flow through the flow meter.

Generally speaking, such a conventional arrangement operates such that the two sensors, when displaced symmetrically from the electromagnet, respond to its oscillation with phases which are different due to an excited Coriolis acceleration in the flowing fluid. As is known, such phase difference is related to the fluid flow rate in a manner such that the actual fluid flow rate itself may be derived from the measured phase difference (coupled with knowing certain other information regarding the arrangement).

The basic construction and theory of operation for such a Coriolis-type flow meter (of the type having at least two analog sensor channels and electromagnetically-driven vibrating-tube design) are fully disclosed and explained in commonly assigned U.S. patents to Colman (U.S. Pat. No. 5,429,002) and Corwon, et al. (U.S. Pat. No. 4,852,410). The complete disclosures of both such '002 and '410 U.S. patents are fully incorporated herein by reference.

The analog sensor outputs under the above circumstances are primarily sinusoidal. Their primary frequency is typically substantially equal to the resonant frequency of the tube vibrations. Since the tubes are mechanical devices, they do not have perfectly linear response to their vibration excitation. Such fact causes a number of harmonic frequencies to be present at multiples of the fundamental frequency. The harmonic multiples are generally odd.

Still further, there may be a number of other sources of interference, growing from either electrical or mechanical sources.

Generally speaking, a Coriolis-type mass flow rate meter is a high precision instrument. In such context, it is to be understood that the measurement accuracy of any flow meter may be degraded from its full potential if interference signals (regardless of source) are not adequately addressed (i.e., filtered). Such fact is equally true regardless of the electronic stage of the signal processing being considered (i.e., whether it is during a flow rate calculation segment or an operational segment).

Additional background references regarding Coriolis-type fluid flow rate measuring devices include Smith (U.S. Pat. No. Re. 31,450); Smith (U.S. Pat. No. 4,422,338); Smith, et al. (U.S. Pat. No. 4,491,025); and Romano (U.S. Pat. No. 4,934,196), the complete disclosures of which are fully incorporated herein by reference.

SUMMARY OF THE INVENTION

The present invention recognizes and addresses various of the foregoing drawbacks, and others, concerning Coriolis-type mass flow rate meters. Thus, broadly speaking, one main object of the present invention is improved apparatus and methodology regarding the use of Coriolis-type mass flow rate meters.

It is another principal object of the present invention to provide improved apparatus and corresponding methodology for operating a Coriolis-type flow meter of the type having at least two analog sensor channels and a vibrating tube design. It is a more particular present object to provide digitally implemented signal processing associated with such a device for improved generation of an optimized tube vibration drive signal.

It is another object of the present invention to provide a digitally-based signal processing arrangement which incorporates phase locked loop tracking of sensor signals for estimating and generating an optimized tube vibration signal. In such context, it is a present object to provide an improved drive signal, obtained with very high levels of accuracy, noise insensitivity, and harmonic rejection, all in an efficiently operable implementation.

It is a further object of the present invention to provide improved Coriolis-based fluid flow rate measuring which more broadly and fully than heretofore practiced obtains digital signal processing advantages of stability, repeatability, and flexibility.

It is yet another present object to provide both apparatus and methodology which afford the above-referenced advantages while also being compatible with existing analog sensor and tube vibration driver interfaces, for improved resonant excitation response in existing and current technology flow meter tubes.

Still further, it is a present object more broadly to provide such improved methodology and apparatus which is also suitable for practice with a variety of meter designs, having in common at least the use of two flow meter output channels carrying sinusoidal analog signals describing tube vibration phenomenon, and having an associated driver arrangement (for example, an electromagnetically-driven device).

Yet another broad present object is to use digitally implemented phase locked loop analysis techniques for considering sensor outputs, resulting in a minimum of signal degradation due to any potential sources of interference. In such context, it is a present object to digitally implement and obtain such advantages and operations with a highly efficient processing methodology, preferably utilizing programmable controllers which are operated with select algorithms, capable of running in real time and responding extremely rapidly to changing conditions in fluid flow, and while providing very high levels of noise and interference filtering to maintain ultimately highest accuracy in the resulting flow rate estimation.

It is another present object to provide an improved flow rate apparatus and corresponding methodology which provides very high precision fluid flow rate metering capability over a wide variety of flow rates and with a wide variety of flowing materials (including materials in either one of liquid or gaseous state or through state changes).

Additional objects and advantages of the invention are set forth in, or will be apparent to those of ordinary skill in the art from, the detailed description herein. Also, it should be further appreciated that modifications and variations to the specifically illustrated and discussed features and steps or materials and devices hereof may be practiced in various embodiments and uses of this invention without departing from the spirit and scope thereof, by virtue of present reference thereto. Such variations may include, but are not limited to, substitution of equivalent means and features, materials, or steps for those shown or discussed, and the functional or positional reversal of various parts, features, steps, or the like.

Still further, it is to be understood that different embodiments, as well as different presently preferred embodiments, of this invention may include various combinations or configurations of presently disclosed features, steps, elements, or their equivalents (including combinations of features or steps or configurations thereof not expressly shown in the figures or stated in the detailed description). One exemplary such embodiment of the present invention relates to an improved Coriolis-type system for measuring a fluid flow rate, comprising first and second fluid flow conduits, driver means for oscillating such conduits, first and second sensor means associated with such conduits, means for digitizing certain analog sensor signals, and means for processing such digitized signals in accordance with the subject invention.

In the foregoing arrangement, the first fluid flow conduit preferably has respective inlet and outlet portions which are substantially coaxial with a first oscillation axis thereof. The second fluid flow conduit likewise has preferably respective inlet and outlet portions which are substantially coaxial with a second oscillation axis thereof and which are parallel to the first oscillation axis. Still further, such second conduit is preferably formed so as to be physically similar to the first conduit, and both conduits are mounted so as to be parallel to each other between their respective end portions (when the flow meter is not in use, i.e., when there are no driven tube vibrations and no fluid flow therethrough).

The above referenced driver means is preferably responsive to a driver signal input for oscillating the first and second conduits relative to each other about their respective oscillation axes. Such oscillation generates a corresponding relative oscillatory motion thereof, which thereby causes oscillating Coriolis accelerations to act on respective fluid flows through the conduits.

The above-referenced first and second sensor means are associated with the conduits for generating analog sinusoidal outputs in two respective predetermined locations in correspondence with the relative motion between the first and second conduits at such two predetermined locations. The means for digitizing operate on such analog sinusoidal outputs and further function for generating corresponding first and second digitized outputs.

The exemplary means for processing preferably operates on such digitized outputs to estimate a fundamental frequency thereof, to estimate a phase shift between the digitized outputs, and to establish from such frequency and phase shift estimates an optimized driver signal input for the driver means. Still further, such means for processing preferably functions for determining from the phase shift a corresponding mass flow rate of fluid flowing through the first and second conduits.

In accordance with additional features which may also be practiced with the foregoing exemplary embodiment, the means for processing may include phase locked loop tracking of the digitized outputs for the elimination of interference and noise distortions in establishing the driver signal input for the driver means. Such tracking is preferably accomplished through heterodyne mixing of the respective digitized outputs with an adjusted phase locked looped tracker frequency, and with subsequent filtering and processing of the respective outputs of the heterodyne mixing so as to determine the frequency and phase shift estimates.

It is to be understood by those of ordinary skill in the art that the present invention fully addresses and encompasses corresponding methodologies. For example, another present exemplary embodiment concerns an improved method of operating a Coriolis-type system for measuring a fluid flow rate, using and operating the above-briefly described arrangement.

Yet another method comprising a present exemplary embodiment relates to a method of determining fluid flow rate through a Coriolis-type flow meter of the type having at least two analog sensor channels and an electromagnetically-driven vibrating-tube design.

In such exemplary method, first, the analog sensor signals are digitized, and then the digitized signals are preferably custom filtered for rejecting interference and noise. Still further, phase locked loop tracking is preferred for dynamically matching the filtering operation with the time-varying sensor waveforms.

In such exemplary methodology, a further step may include processing the filtered signals for obtaining frequency and phase estimates of a drive signal for optimized tube vibrations and using such optimized drive signal for electromagnetically driving such tube vibrations. Also, in accordance with such methodology, one may use the phase estimates to determine phase shift (i.e., phase difference) estimates, and thereafter to determine therefrom a corresponding fluid flow rate through the flow meter.

It is to be further understood that the present invention equally encompasses corresponding digital signal apparatus for determining fluid flow through a Coriolis-type flow meter of the type having at least two analog sensor channels (i.e., signal outputs) and an electromagnetically-driven vibrating-tube design.

In such an exemplary apparatus, analog-to-digital converter means are provided for digitizing the respective analog sensor signals. Thereafter, digital filtering means filter the digitized signals for rejecting interference and noise. Phase locked loop means track the time-varying sensor signal waveforms for dynamically matching operations of the digital filtering means. Means for processing the filtered signals are provided for obtaining frequency and phase estimates therefrom and for outputting a drive signal based thereon for optimized tube vibrations. A driver means is responsive to such drive signal for electromagnetically generating tube vibrations in accordance with the drive signal.

Thereafter, flow rate data means may be used for determining a corresponding fluid flow rate through the flow meter based on determining phase shift (phase difference) estimates from the phase estimate information otherwise obtained through practice of the present invention.

Still further, present exemplary embodiments relate to improved apparatus for operating a Coriolis-type flow meter of the type having at least two analog sensor channels and a vibrating tube design, comprising analog-to-digital converter means for digitizing respective analog sensor signals; digital signal processing means, responsive to the digitized respective sensor signals, for digitally tracking such digitized signals using a phase locked loop and for estimating from such tracking an optimized tube vibration signal; and drive means responsive to such optimized tube vibration signal. Through practice of the foregoing advantageous arrangement, the flow meter tube vibrations may be maintained in accordance with the vibration signal, so that desired tube vibration is maintained based on digital phase locked loop tracking of the sensor signals for improved flow meter operation.

Those of ordinary skill in the art will better appreciate the features and aspects of such embodiments, methods, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
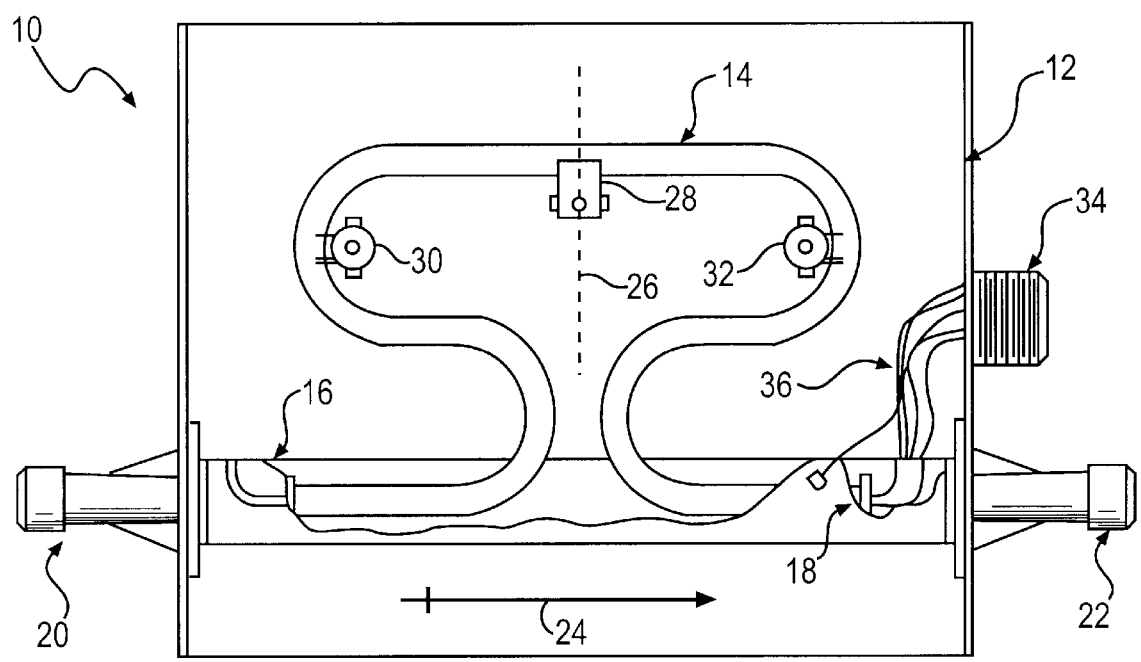
FIG. 1 is a side elevational view, in partial cutaway, of an exemplary embodiment of a conventional Coriolis-type flow meter arrangement of the type having at least two analog sensor channels and an electromagnetically-driven vibrating-tube design, such as may be used in practice of the present invention.

Repeat use of reference characters throughout the present specification and appended drawings is intended to represent same or analogous features, elements, or steps of the invention.

DETAILED DESCRIPTION OF THE PREFERRED EMBODIMENTS

Reference will now be made in detail to the presently preferred embodiments of the invention (including both apparatus and methodology), a complete example of which is fully illustrated and represented in the accompanying drawings. It is to be understood that such example is provided by way of an explanation of the invention, not limitation of the invention. In fact, it will be apparent to those skilled in the art that various modifications and variations can be made in the present invention. For instance, the subject signal processing apparatus and methodology may be utilized in conjunction with different constructions of Coriolis-type mass flow meters, so long as generally such meters are of the type having at least two analog sensor channels (outputs) and a vibrating tube design.

FIG. 1 represents an exemplary such conventional or prior art Coriolis-type flow rate meter device generally 10. Such construction 10 is essentially the same as the devices fully disclosed and explained (both construction and theory of operation) in commonly assigned U.S. Pat. Nos. 5,429,002 and 4,852,410, the complete disclosures of which are fully incorporated herein by reference.

Very briefly, FIG. 1 represents a side elevational view, with partial cross section, of the internal structure of a Coriolis-type device 10. Such meter 10 has a generally rectangular casing 12 within which are contained a pair of fluid flow conduits. An exemplary one of such conduits 14 is shown by the partial sectional view of FIG. 1. Such exemplary conduit 14 has an inlet portion generally 16 and an outlet portion generally 18, respectively associated with inlet and outlet fluid conduit connections generally 20 and 22. As understood by those of ordinary skill in the art, manifolds or other elements are used to split fluid flow entering connection 20 into two separate pathways directed to the respective fluid flow conduits. At the outlet end, flows from the respective conduits are combined for emerging together via connection 22. Hence, the general flow direction within device 10 is in the direction of arrow 24.

As further understood by those of ordinary skill in the art, fluid flow conduit 14 may be generally an omega-shape as illustrated, or may assume other shapes. Such particular construction aspects of meter 10 form no particular part of the present invention.

As further understood, fluid flow conduit 14 has its respective inlet and outlet portions 16 and 18 disposed substantially coaxial with a first oscillation axis thereof, generally represented by dotted line 26. As further understood by those of ordinary skill in the art, the second fluid flow conduit (not seen in FIG. 1) likewise has respective inlet and outlet portions which are substantially coaxial with a second oscillation axis thereof, which axis is parallel to the first oscillation axis 26. Also, the second conduit is formed so as to be physically similar to the first conduit 14. As shown in more particular detail in the above-referenced '002 and '410 patents incorporated herein by reference, the respective conduits are mounted within casing 12 so as to be parallel to each other between their respective end portions when not in use (i.e., whenever the meter is not operated for tube vibrations and no fluid flow passes therethrough).

Still further in accordance with the conventional device 10, driver means generally 28 may be provided for oscillating the first and second conduits relative to each other about their respective oscillation axes. In a conventional device, such driver means is responsive to a driver signal input. Driver means 28 may comprise an electromagnetic coil device, having a magnetizing wire coil and movable magnetic core element, such as described and illustrated in the '002 patent incorporated herein by reference. When operative, driver means causes a corresponding relative oscillatory motion of the conduits, for thereby causing oscillating Coriolis accelerations to act on respective fluid flows through such conduits, all as well known and understood by those of ordinary skill in the art.

Still further in accordance with conventional device 10, respective first and second sensor means generally 30 and 32 may be associated with the conduits for generating analog sinusoidal outputs from the two indicated respective predetermined locations. With such an arrangement, the relative motion of the two conduits at such two predetermined locations may be determined through the output signals from the respective sensors.

Lastly, while various arrangements may be practiced, FIG. 1 represents preferable use of an electrical connector generally 34, and associated electrical signal wires generally 36, by which a driver signal input may be provided to driver means 28 and by which analog sinusoidal outputs may be obtained from sensor means 30 and 32. Such sensors may comprise electromagnetic coil devices, similar to driver means 28, but operated "in reverse" thereto.

It is to be understood that particular connections of the various electrical wires 36 with the components 28, 30, and 32 are not shown in detail, for relative clarity. However, different arrangements of such wiring may be practiced, interconnections of which form no particular aspect of the subject invention.

Figure 2:
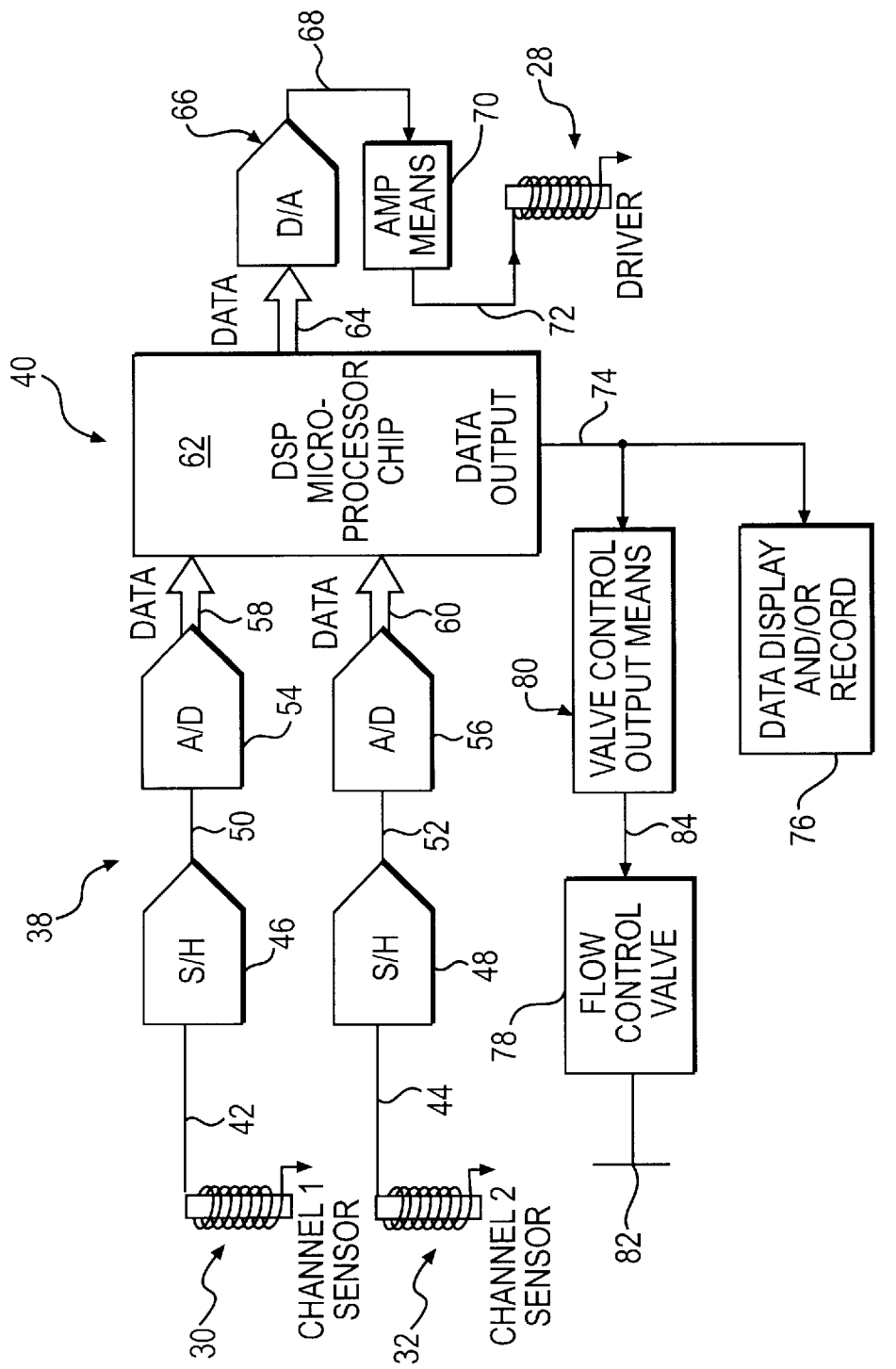
FIG. 2 is a schematic block diagram illustration of an exemplary embodiment of the present invention, as may be used in conjunction with the flow meter apparatus otherwise represented in present FIG. 1.

FIG. 2 diagrammatically represents wiring interconnections of the respective sensor means 30 and 32 relative to other electrical components and aspects of the subject invention. FIG. 2 likewise is representative of the relationship of present electronic components and apparatus with driver means 28. As represented, the present invention is compatible with receiving the analog sinusoidal outputs from the respective sensors 30 and 32 and providing a suitable driver signal for input to driver means 28.

When considered from the block diagram schematic representation level of present FIG. 2, further represented aspects of the present invention include means generally 38 for digitizing respective analog sinusoidal outputs from sensors 30 and 32 and for generating corresponding first and second digitized outputs. Still further, FIG. 2 represents means of the present invention generally 40 for processing such digitized outputs so as to estimate a fundamental frequency thereof, to estimate phases and a phase shift between such digitized outputs, and to establish from such estimates an optimized driver signal input for the driver means 28. Such means for processing may also be operational for determining from such phase shift estimate a corresponding mass flow rate of fluid flowing through the first and second conduits.

In greater detail, such means generally 38 for digitizing may operate separately on the first and second channels as respectively associated with sensor means 30 and 32. Such respective sensors may be interconnected via respective lines 42 and 44 with respective sample and hold devices 46 and 48. In such manner, the integrity of the respective outputs from sensor means 30 and 32 are maintained.

Outputs of the respective sample and hold devices 46 and 48 may be interconnected via lines 50 and 52 with respective analog-to-digital converter means 54 and 56, from which emerge on respective data lines 58 and 60 respective first and second digitized outputs of the analog sinusoidal outputs from lines 42 and 44.

Means generally 40 for processing such digitized outputs 58 and 60 may preferably comprise a programmably controllable device such as a digital signal processing (DSP) microprocessor chip 62. Such DSP chip 62 may comprise any of a number of suitable commercially available devices. One presently preferred example is the part number 2115 DSP chip available from Analog Devices. Such chip is in essence a self-contained 16 bit microprocessor, operating such as at 16 mHz.

Additional details of the operation of exemplary means 40 for processing (DSP chip 62) are discussed in greater detail below with reference to present FIG. 5. Otherwise, it is to be understood that practice of the subject invention provides output data 64 representative of an optimized driver signal for driver means 28. Such digital data 64 is converted by digital-to-analog converter means 66 into an analog sinusoidal signal on line 68, the frequency and phase of which has been determined by operation of processing means 40. An amplifier means 70 may be utilized for establishing a signal amplitude for a final driver signal 72 which is suitably matched to the specific device comprising driver means 28. Selection and operation of such amplifier means 70 relative to a particular driver means 28 is well within the skill of a practitioner in this art, and forms no particular details of the present invention.

Obtaining flow rate information is a well known technique based on calculations starting with phase shift information derived in accordance with this invention from the respective analog sinusoidal signals 42 and 44. As well understood, such two signals 42 and 44 have respective phase differences due to being located (symmetrically displaced) on, opposite sides of the central axis flow path location (dotted line 26) at which driver means 28 is situated.

Utilizing such well known technique for calculating flow rate from phase shift data, processing means 40 may be provided for outputting determined flow rate data on a data output line 74. In a practical application, data outputting means generally 76 may be provided, responsive to the determined flow rate data output 74, for displaying and recording the determined flow rate data and cumulative amounts of fluid flow. Such an arrangement may be implemented in a microprocessor-based device, as well known to those of ordinary skill in the art.

Alternatively, such device 76 may be provided so as to actually calculate or determine the flow rate data, deriving instead from processing means 40 only the basic phase shift data as determined thereby in accordance with this invention. Such variations of practice of the present invention are within the ordinary skill of those practicing in this art, and require no further detailed explanation for an adequate understanding thereof.

Another alternative feature which may be utilized in some practical applications is to automatically control a measured amount of flow, such as in a chemical process, using the Coriolis-type flow rate meter. Specifically, a valve means generally 78 may be provided, responsive to a valve control output means generally 80, for controlling fluid flow through the conduits (represented diagrammatically by element 82). In such an arrangement the valve control output means 80 may be responsive to the determined flow rate data output 74, for establishing a valve control output generally 84 for valve means 78 so as to control a measured fluid flow to a predetermined amount.

For example, if it were desired to pump 100 gallons from a tank A to a tank B, the flow meter device 10 and flow control valve 78 could be both interposed in the established flow lines between tanks A and B. In such fashion, flow rate may be accurately determined until the desired amount (for example, 100 gallons) has passed, after which point the valve means may be operative for terminating further fluid flow.

With the above initial description and disclosure as background, the following discusses in greater detail present apparatus and methodology utilizing digital methods to analyze sensor outputs. In accomplishing such broader purpose of the present invention, spectral parameters are estimated with a minimum of degradation from the above-referenced various sources of interference which may be present.

In the exemplary embodiment discussed hereafter, the present technique utilizes a digital phase locked loop combined with a matched comb filter and decimator to provide a particularly efficient implementation of the present processing methodology. Specific calculation techniques and equations are discussed in detail. The resulting algorithms through operation of such methodology have the advantages of being able to run in real time, and to respond extremely rapidly to changing conditions in the fluid flow being measured, all while providing very high levels of noise and interference filtering. With such approach; a very high precision is maintained in the accuracy of the flow rate estimation.

For clarity in textual presentation and for ease of comparison, equations as discussed herein are presented as numbered equations appearing separately at the end of the present disclosure. Such equations are referenced by number in the body of the disclosure herewith. Application of such equations and the corresponding algorithms used in the present invention is better understood by following particular conditions of the signal processing and its stages in accordance with the subject invention.

Figure 3:
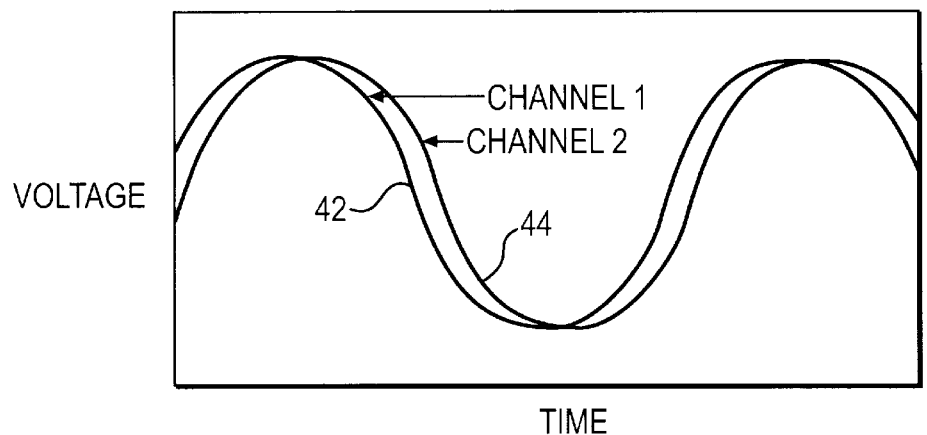
FIG. 3 is an exemplary plot of a pair of analog sinusoidal signals as may be output by a pair of sensor means associated with conduits of a conventional Coriolis-type based arrangement as represented in present FIG. 1.

FIG. 3 represents an exemplary plot of typical analog sinusoidal sensor signals received from respective sensor means 30 and 32, as associated with Coriolis flow meter 10, when containing a flowing fluid, and during operation of driver means 28. The respective first and second channels, as marked, are examples of the signals as appearing on respective lines 42 and 44 of FIG. 2.

As illustrated in present FIG. 3, both signals as present on lines 42 and 44 are generally sinusoidal. They also have a frequency which is substantially equal to the resonant (or fundamental) frequency of the vibrating tubes.

Another important aspect is that the signals on respective lines 42 and 44 are displaced in time from each other. In other words, they have a phase difference or phase shift with respect to one another. When such information is combined with a temperative measurement and some physical parameter calculations, the frequency measurement and the phase difference measurements are sufficient, with the use of well known techniques, to determine the flow rate and density of the fluid in meter 10. See additional explanatory discussion in the above-referenced '002 and '410 U.S. patents, incorporated herein by reference.

Figure 4:
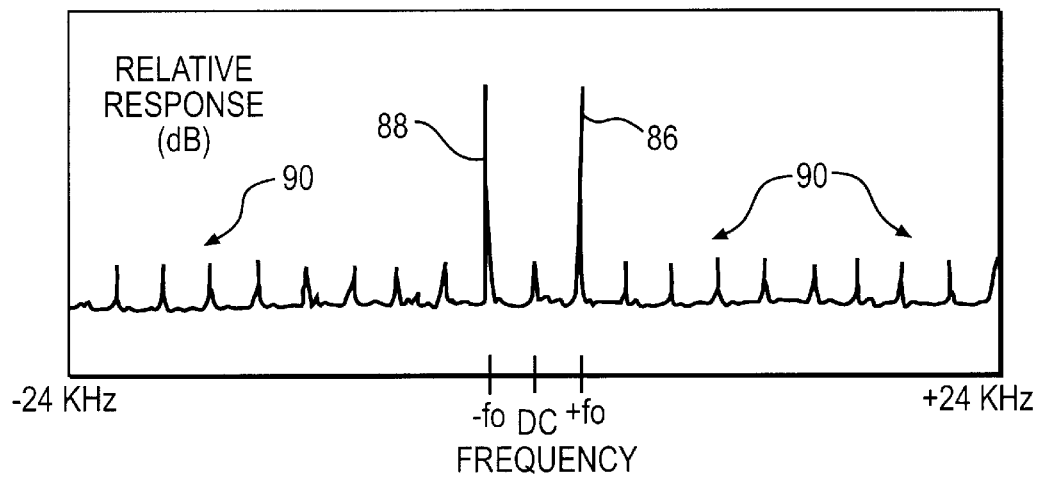
FIG. 4 is a plot of a two-sided frequency spectrum of the exemplary signals of present FIG. 3, for representing numerous small imperfections (interference) present in such signals.

The illustration of present FIG. 3 necessarily represents the signals appearing on lines 42 and 44 as being relatively simple. However, in actuality there are a number of small imperfections (i.e., interference peaks) present in both signals. FIG. 4 better illustrates the interference (e.g., electrical or physical-generated noise) present in the signals. To such end, FIG. 4 represents a plot of the two-sided spectrum of the signals of FIG. 3, up to a frequency of 24 KHz. The spectrum of the illustration of FIG. 4 was constructed using a periodogram method, averaging a select number of consecutive time windows so as to smooth the noise samples, and with amplitude weighting of the signal with a 90-dB Dolph-Chebyshev window to resolve the various spectral features.

The resulting illustration of present FIG. 4 represents that there is a relatively large amount of spectral interference present. Most such interference comprises odd harmonics of the vibrating tube resonant frequency ($f_o$), which are present because the tubes are not exactly linear devices. A variety of nonharmonic interfering signals are also present, coming from electrical sources and tube vibrations in modes and from causes other than the primary excitation. Random thermal noise (i.e., temperature generated) is present due to the resistance in the electrical conducting paths.

Still further, there may be several digital conversion effects, including an analog-to-digital converter DC bias, amplitude mismatch between the channels, quantization noise, and possible analog-to-digital nonlinearities.

Since the input signals being represented by present FIG. 4 are real valued, the sampled spectrum is two-sided, and every signal has a frequency-reflected image, as illustrated.

While a number of the above described effects are relatively small, they are of significant practical importance in view of the extremely high accuracy requirements of the signal measurements. It is therefore of particular advantage of the present invention to be able to provide apparatus and methodology for a signal processing technique which accounts for all of the above-described error sources and minimizes any potential adverse effects therefrom. The disclosure of the exemplary embodiments herewith satisfies such broader purpose of the present invention.

FIG. 4 represents two primary signals 86 and 88, respectively at the primary and frequency-reflected image positions relative to the fundamental frequency $f_o$. The remaining spectral indications (generally 90) represent the above-described signal imperfections or interference.

Signal processing in accordance with the present invention must take into consideration restrictions of the digital components utilized. In the present instance, the algorithms are implemented in a digital signal processing (DSP) chip 62, constituting one of a family of high-speed, low-power real-time embedded processors. As shown above in FIG. 2, such processor 62 is interfaced to the flow meter input and output channels through simultaneous dual analog-to-digital converters 54 and 56 and a digital-to-analog converter 66. Such converters preferably provide 16 bits of relatively dynamic range operating at a sampling rate of 48 KHz. Such large dynamic range is preferred to insure the suppression of any quantization effects of the converters. Also, such relatively high sampling rate provides increased accuracy from averaging a large number of samples.

Figure 5:
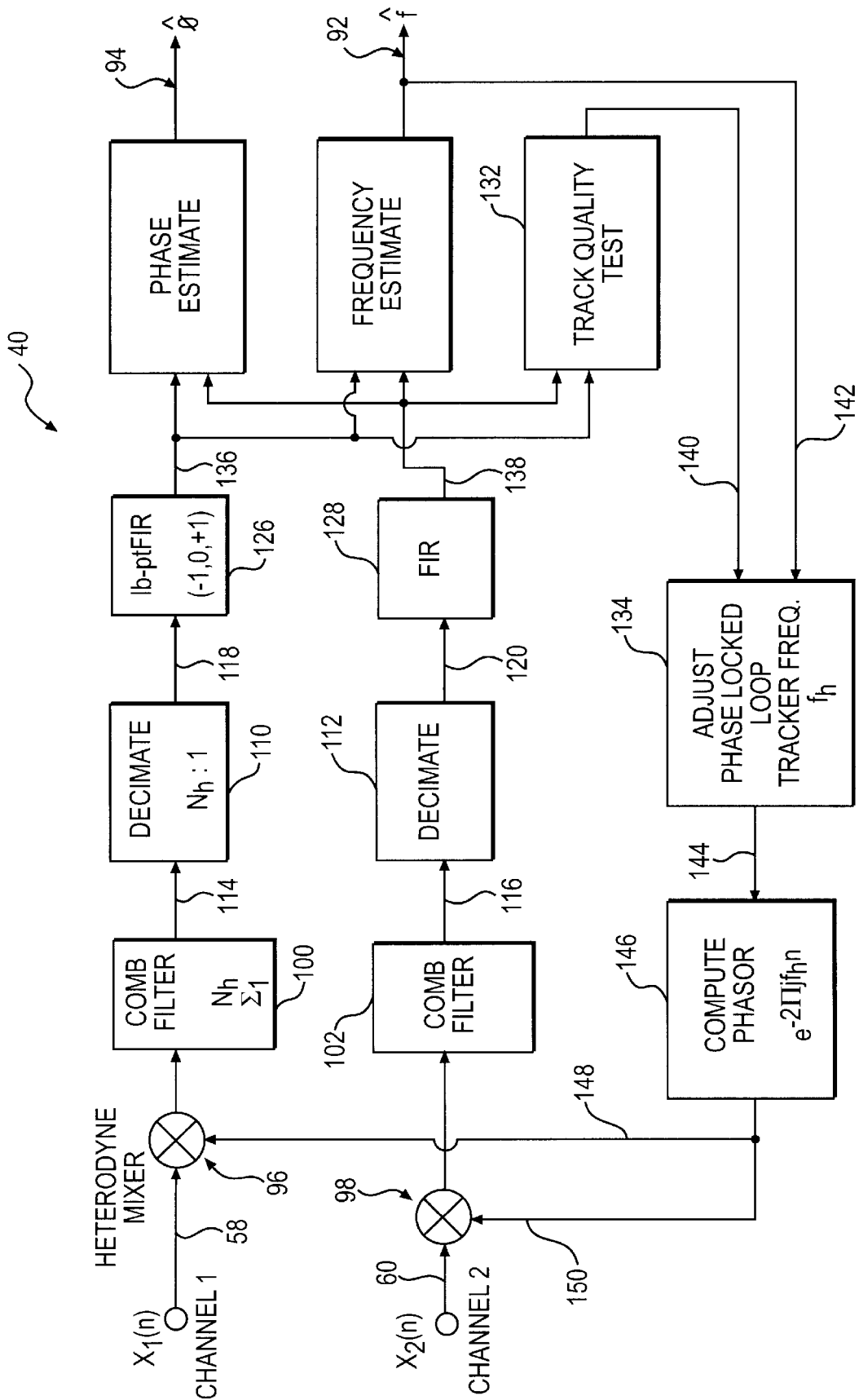
FIG. 5 is a schematic block diagram representation of digital signal processing aspects of an exemplary embodiment, and related methodology, in accordance with the present invention.

FIG. 5 represents a block diagram schematic overview of the signal processing aspects of means generally 40 for processing, per present FIG. 2. As represented by FIG. 5, first and second digitized outputs 58 and 60 are respectively processed, with identical operations (i.e., calculations) being performed for each input sensor channel one and two. The block diagram of present FIG. 5 represents such respective channels also as $x_1(n)$ and $x_2(n)$.

One advantageous aspect of the operation of means generally 40 for processing are the resulting outputs, constituting the frequency estimate output 92 and the phase estimate output 94. It will be understood by those of ordinary skill in the art that since processing means 40 operates on both digitized signals 58 and 60, comparison of their respective phase estimates results in a determination of the relative phase difference or phase shift between the two signals originating with sensor means 30 and 32. As referenced above, it is such information, in part, which ultimately results in determination of a fluid flow estimate.

The overview of present FIG. 5 further represents that the illustrated means for processing includes phase locked loop tracking of the digitized outputs 58 and 60, for the elimination of interference and noise distortions in establishing ultimately the driver signal input for driver means 28. As discussed in greater detail below, such phase locked loop tracking preferably includes heterodyne mixing of the respective digitized outputs with an adjusted phase locked loop tracker frequency, and filtering and processing respective outputs of the heterodyne mixing so as to determine the frequency and phase estimates 92 and 94, respectively.

Still further, such means 40 for processing preferably also includes quality means for testing the quality of tracking of the fundamental frequency through operation of the phase locked loop, and for adjusting the establishment of the frequency estimation based on the determined quality of such tracking.

Referring now with greater detail to FIG. 5, a first stage of signal processing represented is the respective heterodyne mixer means 96 and 98. As with the other features represented and described in present FIG. 5, such mixer means may be implemented in a DSP chip 62 (FIG. 2) as a product of the input time series, x(n), together with a complex-valued signal, in accordance with attached Equation No. (1). In such Equation No. (1), $f_h$ is the heterodyne digital frequency (i.e., tracker frequency). The tracker frequency $f_h$ is related to its period by attached Equation No. (2). In such Equation No. (2), $N_h$ is the number of samples it takes for the mixing means 96 and 98 respectively to complete one 360-degree complex rotation. The mixing means is digitally implemented recursively using an initial condition represented by attached Equation No. (3) and using the complex-valued calculation represented by attached Equation No. (4). Complex numbers are appropriately managed within the DSP chip 62 by storing respectively the real and imaginary parts of each number in separate memory locations.

The effect of the first stage or heterodyne mixing operations is to perform on each respective digitized signal 58 and 60 a frequency translation of the input signal spectrum. As elaborated on below, the heterodyne frequency is selectively set relatively close to the fundamental frequency. After such translation, the fundamental is therefore shifted to DC, as represented by the resulting spectrum shown in present FIG. 6. At this stage, the interference peaks 90 generally are still present in the signal.

A second stage of signal processing as represented in the block diagram schematic illustration of present FIG. 5 begins to address the continuing presence of such interference events 90. Such second stage includes respective comb filters 100 and 102 for the respective first and second channels. Again, such features preferably are implemented digitally in the programmably controllable DSP chip 62.

In this instance, such comb filters 100 and 102 are special or custom digital filters constructed straightforwardly from linearly summing a number of samples $N_c$. As well known to those of ordinary skill in the art, the spectral response of a filter may be represented in a plot. In this instance, the spectral response 104 of comb filter 100 is represented in present FIG. 7. As illustrated, such filter 100 has periodically-spaced nulls occurring at multiples of a fundamental frequency $f_c$, relative to DC, and within the indicated spectral parameters of plus and minus 24 KHz. The spacing of such nulls is further represented by attached Equation No. (5). Such spectral response generally 104 is identical for filters 100 and 102.

Figure 6:
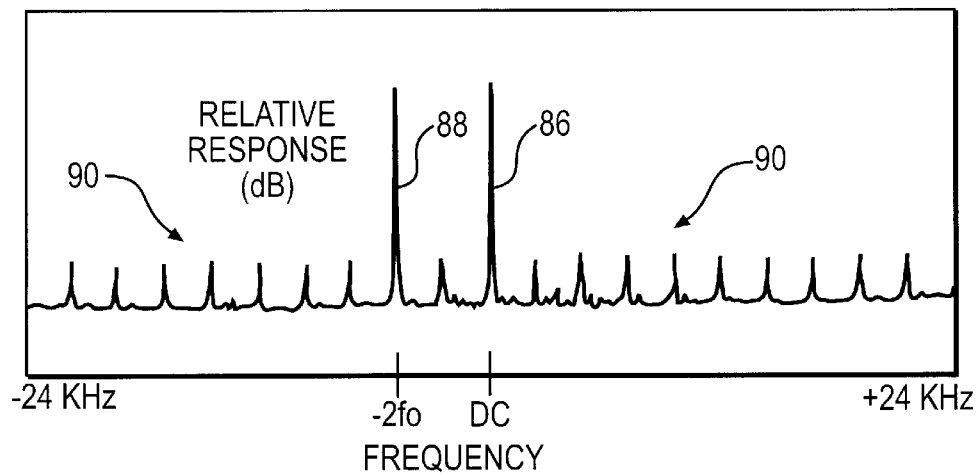
FIG. 6 is an exemplary plot of the signal frequency spectrum subjected to a frequency translation thereof due to operation of the heterodyne mixing stage of the exemplary embodiment of present FIG. 5.
Figure 7:
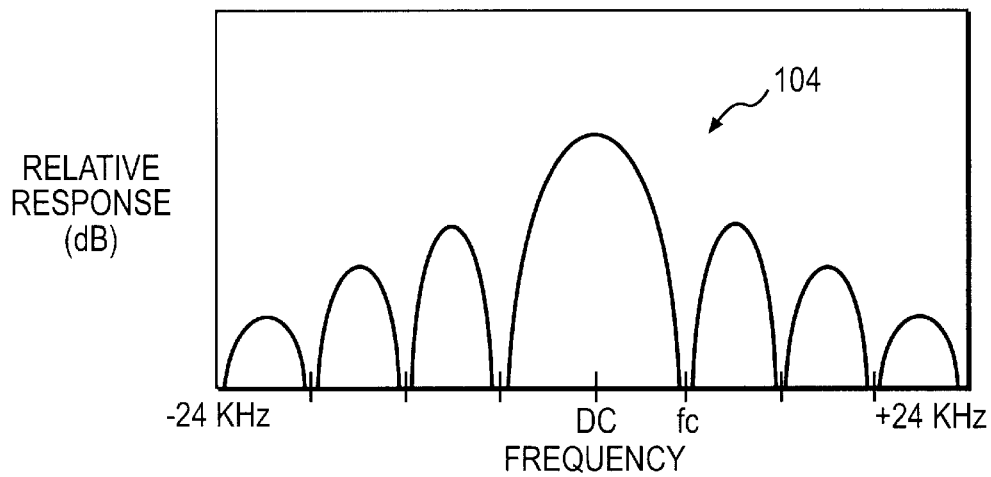
FIG. 7 is an exemplary plot of the frequency spectral response of the comb filter features as represented in the exemplary embodiment of present FIG. 5.

It is to be noted from a comparison of FIGS. 6 and 7 that the sensed tube harmonics 90 (of FIG. 6) and the comb filter nulls (of FIG. 7) are periodic. For such reason, and in such manner, one comb filter (per channel) can reject all the tube harmonics at once by matching such periodicities. With such an approach, and by comparing Equation Nos. (2) and (5), such may be readily accomplished by using a setting in accordance with attached Equation No. (6).

Figure 8:
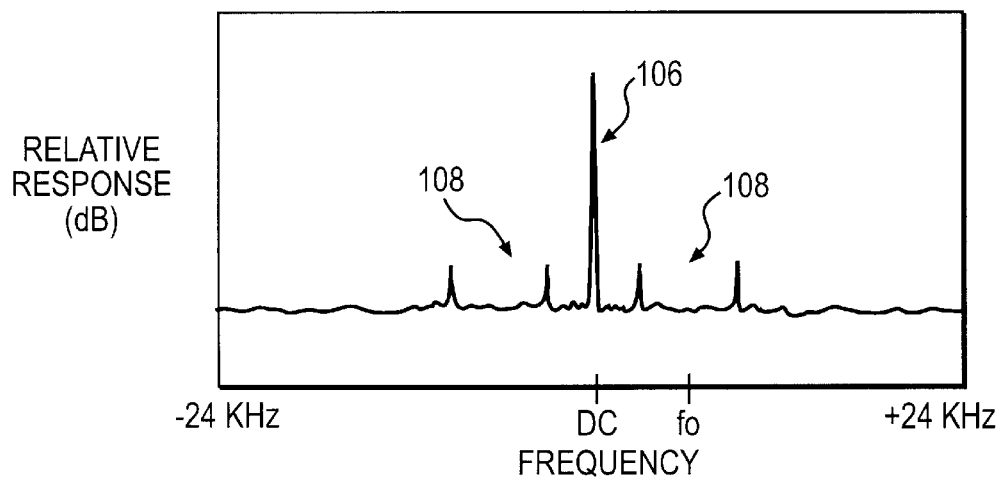
FIG. 8 is an exemplary plot of the resulting signal spectrum after operation on a signal passing through the comb filter features as represented in the present embodiment of FIG. 5.

Present FIG. 8 represents the signal spectrum after operation of the heterodyne mixer means 96 and 98 and after operation of the matched comb filters 100 and 102. By such operations, all of the tube harmonics 90 and their images have been filtered (i.e., rejected). In addition, the analog-to-digital DC bias signal has been eliminated. Aside from the primary signal generally 106, as represented there are still several interfering signals generally 108 present, but their total number is greatly reduced.

The third stage of signal processing with digitally implemented processor means 40 is decimation, represented by decimate means 110 and 112 for the respective first and second channels. Since the fundamental frequency was shifted to DC during operation of the heterodyne mixer means 96 and 98, the need to sample at a relatively higher rate is no longer present. At the outputs 114 and 116 of the comb filter operations, all of the fundamental signal information may actually be represented in a single comb filter summation, as shown in attached Equation No. (7). As represented by such Equation No. (7), the entire $N_h$-sample input time series is therefore decimated (i.e., reduced) to as single complex-valued output, y.

Figure 9:
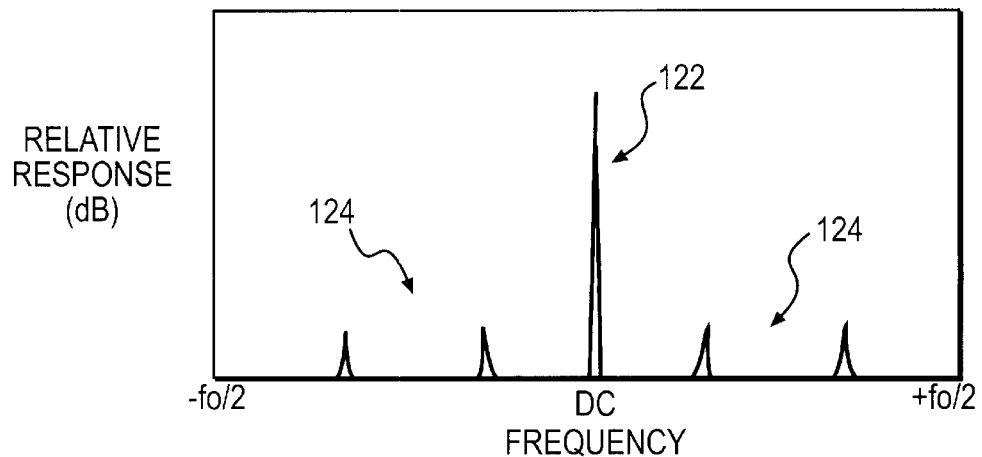
FIG. 9 is an exemplary plot of the resulting frequency spectrum of a signal after operation of the decimation features as represented in the exemplary embodiment of present FIG. 5.

The resulting outputs 118 and 120 from the respective decimation operations 110 and 112 have certain spectral consequences, as represented by the resulting spectrum of present FIG. 9. In essence, the decimation operations cause the spectrum to be aliased and summed at a rate equal to the decimation frequency. However, such decimation frequency is equal to the comb filter frequency, which itself was already matched to the heterodyne and input fundamental frequency.

As represented in such FIG. 9, the processing bandwidth (the total horizontal axis representation of present FIG. 9) is now equal to the original fundamental frequency $f_0$. Aside from the signal generally 122 of interest, there is still some interference generally 124 present, but it is now established with certainty that such remaining interference generally 124 will not fold on to the fundamental 122 at DC because only harmonics of the decimation frequency can end up at DC, and all such harmonics were removed by operation of the comb filter means 100 and 102.

To this point, each respective digitized signal 58 and 60 associated with the first and second channels has been subjected to three levels of signal processing (heterodyne mixing 96/98, comb filtering 100/102, and decimation 110/112). It is significant to understand that all three such processing operations were matched to the same frequency as the input fundamental. The advantage of such signal processing operation is considerable simplicity, resulting in processing steps amounting to updating a complex phasor, multiplying by the input signal, accumulating a complex sum, and after a predetermined number of samples ($N_h$), outputting one result. Advantageously with such simplicity, the entire foregoing sequence may be relatively rapidly computed in real time as samples are received, and then stored in-place using a minimum amount of memory.

A second advantage of the foregoing signal processing operations is that, with correctly matched frequencies, the highly corrupted input spectrum has been manipulated into a very usable signal. With the fundamental signal being situated at DC (peak 122 of FIG. 9), peak 122 is well separated from the few remaining interference lines generally 124 (FIG. 9) which are not. The matched-frequency condition is central to achieving such efficient and advantageous signal processing results. Such aspect is best achieved by the phase locked loop aspect of the signal processing in accordance with the subject invention, as discussed hereinafter.

As represented in present FIG. 5 by the respective first and second channels, the above-discussed signal processing operations are performed in parallel on both such channels. In practice, a relatively large number of analog-to-digital samples are filtered and combined into single complex phasor summations, with one for each channel. From this, present methodology and apparatus may be utilized for achieving the object of estimating the fundamental frequency and phase of each of the input waveforms, ultimately output at 92 and 94 respectively on FIG. 5.

In the hypothetical case of perfect tracking, the fundamental frequency would be shifted to D.C. by the respective heterodyne mixer means 96 and 98. Of course, frequency tracking is never perfect. Instead, there is at least a small frequency displacement from DC which, when estimated, may be summed with the heterodyne shift to derive the exact input fundamental frequency.

The foregoing DC frequency offset is estimated using three finite impulse response (FIR) filters per channel, generally 126 and 128 as represented in present FIG. 5. All such filter devices may be digitally implemented within processing means 40, as broadly referenced above. Each uses a 16-point weighted window to reject from the estimates the remaining interference peaks generally 124 of present FIG. 9.

Figure 10:
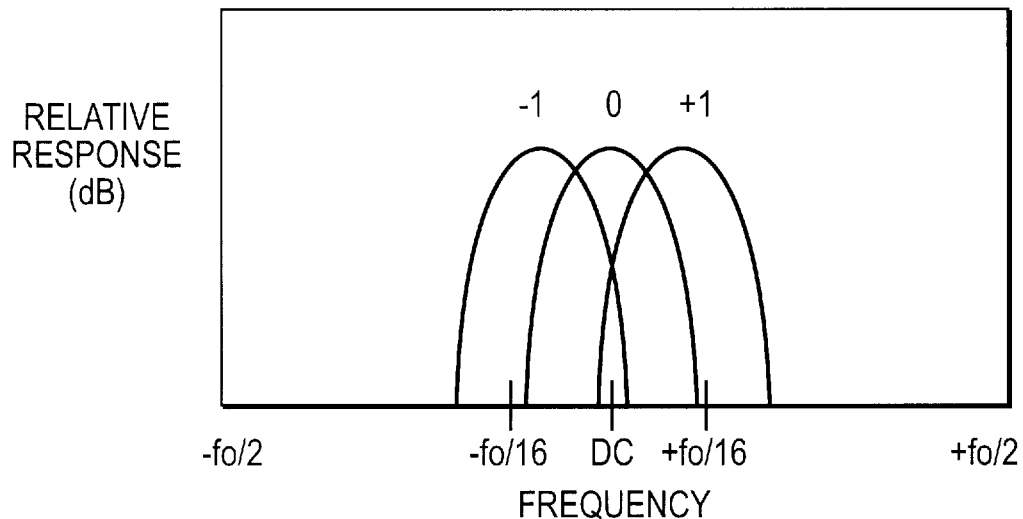
FIG. 10 an exemplary plot representing the three filter stages of each of the finite impulse response (FIR) filters per such features as represented in the exemplary embodiment of present FIG. 5.
Figure 11:
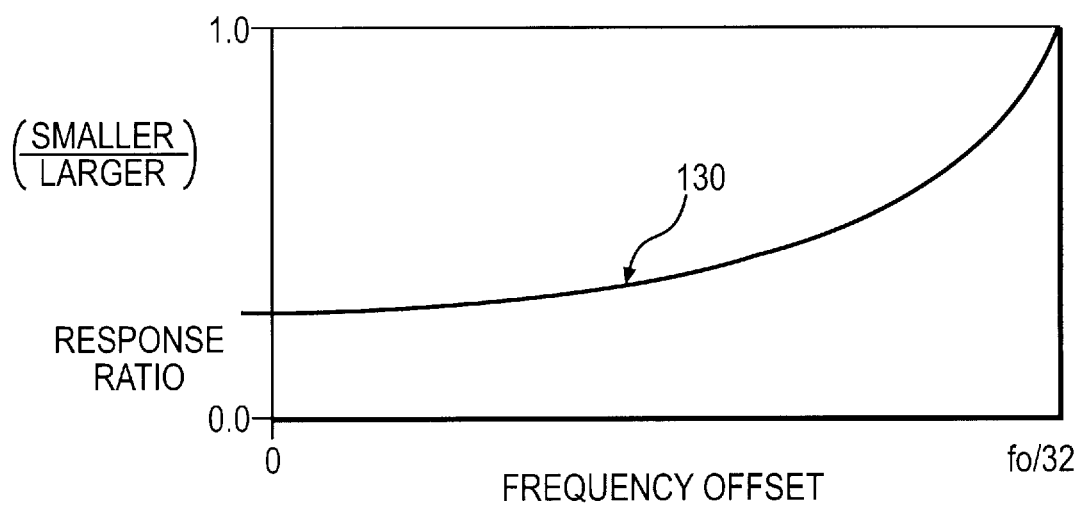
FIG. 11 is an exemplary plot of frequency offset data (horizontal axis) versus FIR response ratio data (vertical axis), as derived from operation of the features represented in the exemplary embodiment in present FIG. 5.

In practice, such filters 126 and 128 preferably are all narrow band-pass filters centered at defined filter positions −1, 0, and +1, as represented in present FIG. 10. It is to be understood that the FIR responses are all complex-valued. Hence, comparison of the FIR response amplitudes allows determination of the DC frequency offset. The sign of such offset is in the direction of the larger side filter. The magnitude of the offset is related to the response amplitude ratio. With relatively high input signal-to-noise ratios (SNR), and with interference rejection achieved, the mean frequency offset becomes a predictable function (curve 130) of the FIR response ratios, as represented in present FIG. 11. Such relationship is used to construct a lookup table to derive the frequency estimate from the measured FIR response ratios, as represented by attached Equation No. (8).

Responses are averaged over both input channels 58 60 since the sensor frequencies should be identical in both channels.

Since all of the signal processing operations described thus far are linear, the phase of the fundamental sinusoid may be linearly related to the phase of the complex filter response summations. While some phase translations may occur, it is to be understood that they are common to both channels and therefore have no affect on the phase difference estimate. Therefore, the phases are computed from the complex responses, per attached Equation No. (9) and then the inter-channel phase difference may be computed from attached Equation No. (10). Estimation errors may be further reduced by averaging the phase difference across all three FIR filters, with weighting of each estimate in accordance with the response amplitude.

It is to be understood that the above signal processing operations are based on an assumption that relatively good tracking of the fundamental input frequency has occurred. Under such assumption and resulting conditions, the heterodyne mixer means and comb filter means are matched to such input, the interference rejection is virtually ideal, and the final frequency estimate may be made by adding the small DC-offset frequency estimate. In other words, accuracy is maximized for the respective frequency and phase estimations 92 and 94 by minimizing the effects of various interfering signals as outlined above. However, the present invention equally addresses apparatus and methodology for addressing conditions where the assumption of good tracking does not hold.

Generally speaking, in accordance with the subject invention, frequency tracking is preferably performed by phase locked loop signal processing. At the FIR signal processing stages 126 and 128, two possible conditions may occur relative to tracking: either the phase locked loop is successfully tracking or it is not. Such possibility is addressed with the present invention by application of track quality testing means 132 and tracker frequency adjustment means 134.

If the phase locked loop (PLL) is tracking relatively well, the center FIR ("0") contains nearly all the energy of the input waveform including adjustments for signal processing gain. However, if the tracking is more relatively marginal, one or the other side filters ("−1" or "+1") will contain most of the input energy. If tracking is poorer still, potentially none of the three FIR filters will contain sufficient energy. The track quality testing means 132 is digitally implemented within signal processing means 40. The outputs 136 and 138 from FIR filters 126 and 128 respectively are input into track quality testing means 132. From such inputs, testing means 132 in straightforward fashion computes a track quality test from the ratios of such three responses relative to the input signal energy. The resulting ratios are compared to a threshold set from an offline signal simulation.

In the case of relatively good PLL tracking, the DC frequency offset is fed back in order to fine tune the heterodyne mixer frequency, per attached Equation No. (11). However, in the case of relative poor PLL tracking, the fundamental input frequency is more crudely estimated from the rate of complex phasor rotation of the decimator outputs, as determined by attached Equation No. (12).

Such adjustment of the tracker frequency $f_h$ is represented by means 134, which receives output from the testing means 132 via line 140 and which receives the frequency estimate 92 via line 142. Once means 134 adjusts the tracker frequency in accordance with the determined tracking quality, an output from means 134 via line 144 provides means 146 with the tracker frequency input information necessary in order to compute the phasor actually fed back via respective lines 148 and 150 to heterodyne mixer means 96 and 98, respectively.

Because the more crude estimate obtained by Equation No. (12) is incorrectly filtered, it suffers degradation from unattenuated input interference. However, the important aspect to understand is that such estimate is adequate to permit good tracking at least to occur within one filter cycle. Therefore, the overall approach allows the phase locked loop to lock onto the fundamental input frequency very rapidly.

In either case (in other words, regardless of how means 134 adjusts the tracker frequency $f_h$), digital processing in accordance with the present invention obtains phase locked loop benefits of an output statistic being proportional to the frequency tracking error and being fed back in order to correct the tracker on its next iteration.

In practice with various actual flow meters 10, the extreme range of tube resonant frequencies generally falls in a range between 30 and 120 Hz. Also, any given tube typically drifts less than 10 Hz during use. With the above advantageous arrangement, the relatively instantaneous capture range of the phase locked loop is roughly plus or minus 45% of the current heterodyne frequency. Accordingly, it is sufficient in accordance with practice of the present invention to initialize the tracker rather coarsely to a tube-size-dependent default frequency. From there, it will reliably track all frequency excursions during use, and testing has shown such tracking abilities in fact to be extremely robust.

With operation of the processing means 40 of present FIG. 5 in the overall context of present FIG. 2, once the above stages are accomplished, the final processing stage is generation of a drive signal 72 (FIG. 2). With operation and practice of the present invention, such drive signal 72 is an optimized waveform generated at the sensed resonant frequency and with the proper phase relationship to the magnet transducer signal on the previous filter cycle. For example, a trapezoidal waveform with such characteristics may be output through the digital-to-analog converter 66 to amplifier means 70, and thereafter output to driver means 28. In such fashion, the present invention accomplishes the broader purpose of optimized maintenance of tube vibration by generating an optimized tube vibration drive signal.

At the same time, the present disclosure represents that operation of the present invention is in effect "plug-in-compatible" with any standard two-channel electromagnetically-driven vibrating-tube flow meter design, requiring only basic analog-to-digital and digital-to-analog converter interface technology. There is, in fact, no need to change from conventional devices the manner in which the actual mass flow rate and density are calculated, once the frequency estimate, phase estimate, and phase shift (or difference) data is derived in accordance with the present invention. As discussed, the peculiar spectral features characteristic of vibrating tube technology have been addressed and an optimized processing arrangement provided. Advantageously, the custom or comb filtering approach nulls all interfering harmonics, while the phase locked loop feedback methodology tracks both the fundamental signal as well as its relative interference in order to maintain the above-discussed favorable conditions over time with a time-varying input signal.

Also, the means for performing frequency estimation, phase estimation, and frequency tracking, as well as other aspects, may all be conducted in a programmably controllable digital signal processing microprocessor. The particularly efficient computational techniques disclosed herewith thus may be rendered in real time and with a minimum requirement for processor memory. At the same time, the improvement in feeding back an estimated sensor signal for driving the tube vibration driver means 28 advantageously contributes to improved positive maintenance of tube vibration.

It should be further understood by those of ordinary skill in the art that the foregoing presently preferred embodiments (both apparatus and methodology) are exemplary only, and that the attendant description thereof is likewise by way of words of example rather than words of limitation, and their use does not preclude inclusion of such modifications, variations, and/or additions to the present invention as would be readily apparent to one of ordinary skill in the art, the scope of the present invention being set forth in the appended claims.

Equations $$c(n) = e^{-2\pi j f_h n} \tag{1}$$

$$f_h = \frac{1}{N_h} \tag{2}$$

$$c(O) = 1 \tag{3}$$

$$c(n+1) = c(n) \cdot e^{-2\pi j f_h} \tag{4}$$

$$f_c = \frac{1}{N_c} \tag{5}$$

$$N_c = N_h \tag{6}$$

$$y = \sum_{n=1}^{N_h} x(n) \, e^{-2\pi j f_h n} \tag{7}$$

$$\hat{\Delta f} = T\left(\frac{r_{min}}{r_{max}}\right) \tag{8}$$

$$\hat{\phi}_{i=arg}[r_i] \tag{9}$$

$$\hat{\Delta\phi} = \hat{\phi}_1 - \hat{\phi}_2 \tag{10}$$

$$f_h(k30\ 1) = f_h(k) + \hat{\Delta f} \tag{11}$$

$$\hat{\Delta f} = \frac{1}{2\pi} \, arg[y_k^* y_{k+1}] \tag{12}$$

What is claimed is:

1. An improved Coriolis-type system for measuring a fluid flow rate, comprising:

a first fluid flow conduit having respective inlet and outlet portions which are substantially coaxial with a first oscillation axis thereof;

a second fluid flow conduit having respective inlet and outlet portions which are substantially coaxial with a second oscillation axis thereof and parallel to said first oscillation axis, with said second conduit being formed so as to be physically similar to said first conduit, and further with said first and second conduits being mounted so as to be parallel to each other between their respective end portions when not in use;

driver means, responsive to a driver signal input, for oscillating said first and second conduits relative to each other about their respective oscillation axes for generating a corresponding relative oscillatory motion thereof, and for thereby causing oscillating Coriolis accelerations to act on respective fluid flows through said conduits;

respective first and second sensor means associated with said conduits for generating analog sinusoidal outputs at two respective predetermined locations in correspondence with said relative motion between said first and second conduits at said two predetermined locations;

means for digitizing said analog sinusoidal outputs and for generating corresponding first and second digitized outputs; and means for processing said digitized outputs to estimate a fundamental frequency thereof, to estimate a phase shift between said digitized outputs, and to establish from said frequency and phase shift estimates an optimized driver signal input for said driver means, and for determining from said phase shift a corresponding mass flow rate of fluid flowing through said first and second conduits.

2. An improved Coriolis-type system for measuring a fluid flow rate as in claim 1, wherein said means for processing includes phase locked loop tracking of said digitized outputs for the elimination of interference and noise distortions in establishing said driver signal input for said driver means.

3. An improved Coriolis-type system for measuring a fluid flow rate as in claim 2, wherein said phase locked loop tracking includes heterodyne mixing of said respective digitized outputs with an adjusted phase locked loop tracker frequency, and filtering and processing respective outputs of said heterodyne mixing so as to determine said frequency and phase shift estimates.

4. An improved Coriolis-type system for measuring a fluid flow rate as in claim 3, wherein said means for processing includes quality means for testing the quality of tracking of said fundamental frequency through operation of said phase locked loop, and for adjusting the establishment of said frequency estimation based on the determined quality of such tracking.

5. An improved Coriolis-type system for measuring a fluid flow rate as in claim 1, wherein said means for processing comprises a programmably controllable digital signal processing microprocessor.

6. An improved Coriolis-type system for measuring a fluid flow rate as in claim 1, further including:
  valve means responsive to a valve control output means, for controlling fluid flow through said conduits; and
  valve control output means, responsive to determined flow rate data output, for establishing a valve control output for said valve means so as to control measured fluid flow to a predetermined amount; and
  wherein said means for processing further includes means for establishing determined flow rate data output for said valve control output means.

7. An improved Coriolis-type system for measuring a fluid flow rate as in claim 1, further including:
  data outputting means, responsive to determined flow rate data output, for displaying and recording the determined flow rate data and cumulative amounts of fluid flow; and
  wherein said means for processing further includes means for establishing determined flow rate data output for said data outputting means.

8. An improved method of operating a Coriolis-type system for measuring a fluid flow rate, comprising:
  providing a first fluid flow conduit having respective inlet and outlet portions which are substantially coaxial with a first oscillation axis thereof;
  providing a second fluid flow conduit having respective inlet and outlet portions which are substantially coaxial with a second oscillation axis thereof and parallel to said first oscillation axis, with said second conduit being formed so as to be physically similar to said first conduit, and further with said first and second conduits being mounted so as to be parallel to each other between their respective end portions when not in use;
  responsive to a driver signal, oscillating said first and second conduits relative to each other about their respective oscillation axes for generating a corresponding relative oscillatory motion thereof, and for thereby causing oscillating Coriolis accelerations to act on respective fluid flows through said conduits;
  generating analog sinusoidal outputs at two respective predetermined locations in correspondence with said relative motion between said first and second conduits at said two predetermined locations;
  digitizing said analog sinusoidal outputs and generating corresponding first and second digitized outputs;
  processing said digitized outputs to estimate a fundamental frequency thereof, to estimate a phase shift between said digitized outputs, and to establish from said frequency and phase shift estimates an optimized driver signal and using said optimized driver signal for oscillating said conduits; and
  determining from said phase shift a corresponding mass flow rate of fluid flowing through said first and second conduits.

9. An improved method of operating a Coriolis-type system for measuring a fluid flow rate as in claim 8, wherein said processing step includes phase locked loop tracking of said digitized outputs for the elimination of interference and noise distortions in establishing said optimized driver signal.

10. An improved method of operating a Coriolis-type system for measuring a fluid flow rate as in claim 9, wherein said phase locked loop tracking includes heterodyne mixing of said respective digitized outputs with an adjusted phase locked loop tracker frequency, and further includes filtering and processing respective outputs of said heterodyne mixing so as to determine said frequency and phase shift estimates.

11. An improved method of operating a Coriolis-type system for measuring a fluid flow rate as in claim 10, wherein said processing step includes testing the quality of tracking of said fundamental frequency through operation of said phase locked loop, and adjusting the establishment of said frequency estimation based on the determined quality of such tracking.

12. An improved method of operating a Coriolis-type system for measuring a fluid flow rate as in claim 8, further including the step of controlling fluid flow through said conduits so as to control measured fluid flow to a predetermined amount based on determined fluid flow rate data.

13. An improved method of operating a Coriolis-type system for measuring a fluid flow rate as in claim 8, further including the step of displaying and recording determined flow rate data and cumulative amounts of fluid flow as derived therefrom.

14. An improved method of operating a Coriolis-type system for measuring a fluid flow rate as in claim 8, wherein said processing step includes matching the operational frequencies of said processing to the fundamental of said optimized driver signal.

15. A method of determining fluid flow rate through a Coriolis-type flow meter of the type having at least two analog sensor channels and an electromagnetically-driven vibrating-tube design, comprising the steps of:
  digitizing the analog sensor signals;
  custom filtering the digitized signals for rejecting interference and noise;
  using phase locked loop tracking for dynamically matching the filtering operation with the time-varying sensor waveforms;
  processing the filtered signals for obtaining frequency and phase estimates of a drive signal for optimized tube vibrations and using such optimized drive signal for electromagnetically driving tube vibrations; and using said phase estimates to determine phase shift estimates and to determine therefrom a corresponding fluid flow rate through said flow meter.

16. A method as in claim 15, wherein said custom filtering includes using a comb filter for nulling out interfering harmonics.

17. A method as in claim 15, wherein said phase locked loop tracking includes heterodyne mixing of the respective digitized signals using an adjusted tracker frequency.

18. A method as in claim 17, wherein said tracking further includes adjusting the establishment of said tracker frequency based on the determined quality of such tracking.

19. A method as in claim 15, wherein said tracking step and said processing step for obtaining estimates are performed in a programmably controllable digital signal processing microprocessor.

20. Digital signal processing apparatus for determining fluid flow through a Coriolis-type flow meter of the type having at least two analog sensor channels and an electromagnetically-driven vibrating-tube design, comprising:

analog-to-digital converter means for digitizing respective analog sensor signals;

digital filtering means for filtering the digitized signals for rejecting interference and noise therefrom;

phase locked loop means for tracking the time-varying sensor signal waveforms for dynamically matching operations of said digital filtering means thereto;

means for processing the filtered signals for obtaining frequency and phase estimates therefrom and for outputting a drive signal based thereon for optimized tube vibrations;

driver means, responsive to said drive signal, for electromagnetically generating tube vibrations in accordance with said drive signal; and flow rate data means for determining a corresponding fluid flow rate through the flow meter based on determining phase shift estimates from said phase estimates.

21. An apparatus as in claim 20, wherein said digital filtering means includes a respective comb filter means for each of the digitized signals for nulling out interfering harmonics thereon.

22. An apparatus as in claim 20, wherein said phase locked loop means includes:

a respective heterodyne mixer operative with each of the digitized signals for mixing such respective digitized signals with an adjusted tracker frequency; and tracker frequency means for establishing an adjusted tracker frequency for use with said respective heterodyne mixers.

23. An apparatus as in claim 22, further including quality means for adjusting a frequency estimate used by said tracker frequency means based on determined quality of tracking by said phase locked loop means.

24. An apparatus as in claim 20, further including means for programmably controlling said digital filtering means, said phase locked loop means, and said means for processing.

25. Improved apparatus for operating a Coriolis-type flow meter of the type having at least two analog sensor channels and a vibrating tube design, comprising:

analog-to-digital converter means for digitizing respective analog sensor signals;

digital signal processing means, responsive to the digitized respective sensor signals, for digitally tracking such digitized signals using a phase locked loop and for estimating from such tracking an optimized tube vibration signal; and drive means, responsive to said optimized tube vibration signal, for maintaining flow meter tube vibrations in accordance with said vibration signal, so that desired tube vibration is maintained based on digital phase locked loop tracking of the sensor signals for improved flow meter operation.

26. An improved apparatus as in claim 25, wherein said digital signal processing means includes means for heterodyne mixing of the respective digitized signals with an adjusted tracker frequency, and further includes filtering means for filtering the mixed signals.

27. An improved apparatus as in claim 26, wherein said digital signal processing means further includes means for determining frequency and phase estimates for the respective filtered signals.

28. An improved apparatus as in claim 27, wherein said digital signal processing means includes means for estimating said optimized tube vibration signal based on said frequency and phase estimates.

29. An improved apparatus as in claim 27, further including means for determining fluid flow through said flow meter based on said phase estimates for the respective filtered signals.

\* \* \* \* \*